(12) United States Patent
Nielsen et al.

(10) Patent No.: US 8,362,632 B2
(45) Date of Patent: Jan. 29, 2013

(54) WIND TURBINE, A METHOD FOR CONTROLLING A WIND TURBINE AND USE THEREOF

(75) Inventors: Thomas Steiniche Bjertrup Nielsen, Randers (DK); Bo Juul Pedersen, Hadsten (DK)

(73) Assignee: Vestas Wind Systems A/S, Aarhus n (DK)

( * ) Notice: Subject to any disclaimer, the term of this patent is extended or adjusted under 35 U.S.C. 154(b) by 267 days.

(21) Appl. No.: 12/744,740

(22) PCT Filed: Nov. 27, 2008

(86) PCT No.: PCT/DK2008/000421
§ 371 (c)(1),
(2), (4) Date: May 26, 2010

(87) PCT Pub. No.: WO2009/068036
PCT Pub. Date: Jun. 4, 2009

(65) Prior Publication Data
US 2010/0301604 A1    Dec. 2, 2010

(30) Foreign Application Priority Data

Nov. 30, 2007  (DK) ................................ 2007 01719

(51) Int. Cl.
*F03D 9/00*    (2006.01)
(52) U.S. Cl. .......................................... 290/44; 290/55
(58) Field of Classification Search ..................... 290/44, 290/55
See application file for complete search history.

(56) References Cited

U.S. PATENT DOCUMENTS

| | | | |
|---|---|---|---|
| 3,971,166 A | 7/1976 | Habeck et al. | |
| 4,161,658 A * | 7/1979 | Patrick | ........................... 290/44 |

(Continued)

FOREIGN PATENT DOCUMENTS

| | | |
|---|---|---|
| EP | 1 429 025 | 6/2004 |
| EP | 1 612 412 | 1/2006 |

(Continued)

OTHER PUBLICATIONS

Gabriele Giorgini; International Search Report and Written Opinion issued in related PCT patent application No. PCT/DK2008/000421; Mar. 22, 2010; 11 pages; European Patent Office.

(Continued)

*Primary Examiner* — Tho D Ta
(74) *Attorney, Agent, or Firm* — Wood, Herron & Evans, LLP

(57) ABSTRACT

The invention provides for a wind turbine comprising a rotor comprising at least one rotor blade, a yaw controlling system including yaw control means, a yaw mechanism comprising one or more yaw motors and a yaw bearing, registration means for registering an idling power producing situation of the wind turbine in relation to a utility grid, and detection means for detecting edgewise oscillations in one or more of the blades. The yaw controlling system is adapted for changing the yaw position of the wind turbine nacelle when said registration means registers that said wind turbine is operating in an idling power producing situation and the detection means detects edgewise oscillations in one or more of the rotor blades, hereby damping or eliminating the edgewise oscillations. The invention further relates to a method for controlling a wind turbine and use hereof.

20 Claims, 4 Drawing Sheets

U.S. PATENT DOCUMENTS

Figure 1:
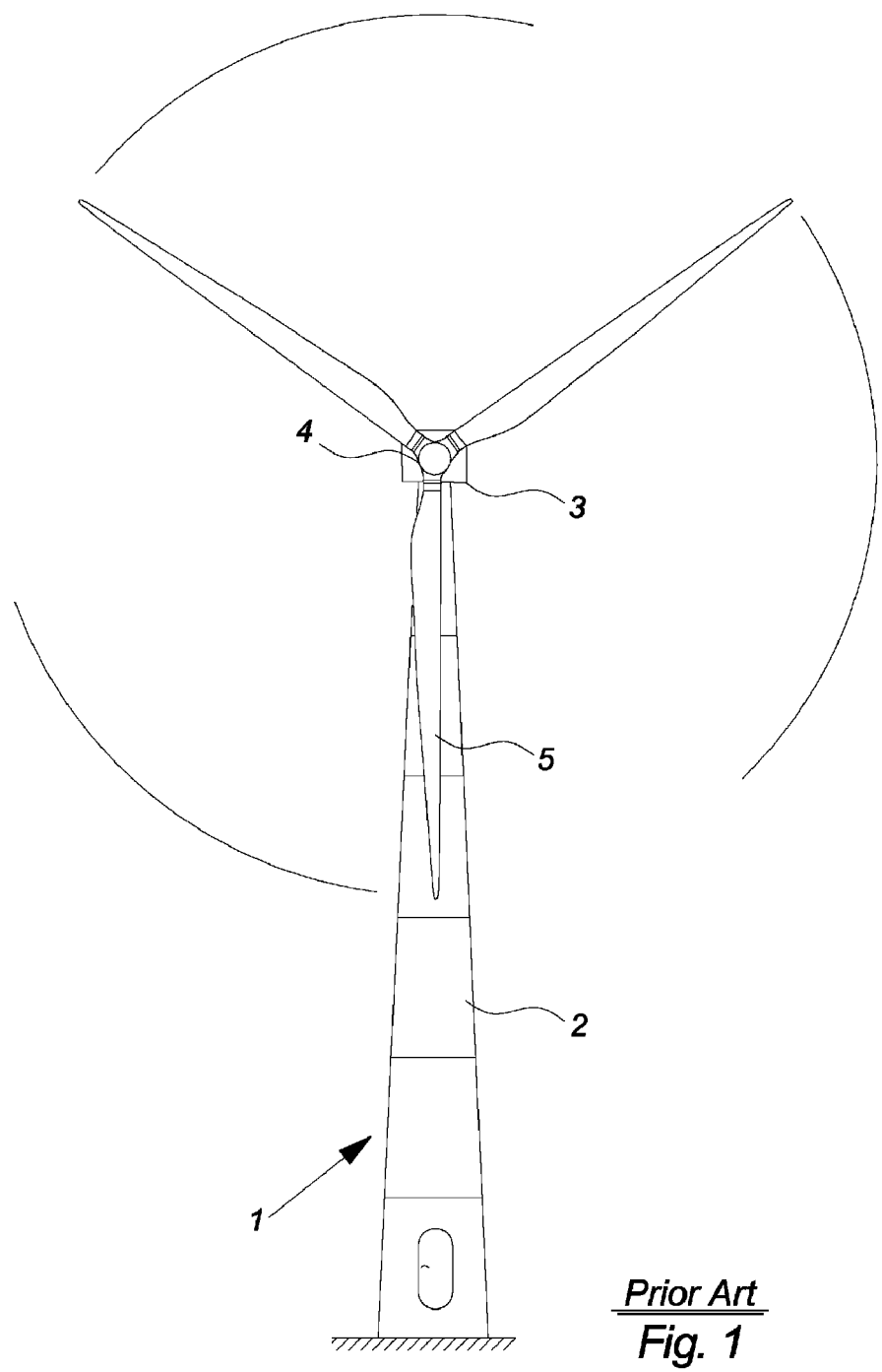

| | | | |
|---|---|---|---|
| 4,193,005 A | 3/1980 | Kos et al. | |
| 4,280,059 A | 7/1981 | Zickwolf, Jr. | |
| 4,297,076 A | 10/1981 | Donham et al. | |
| 4,334,823 A | 6/1982 | Sharp | |
| 4,426,192 A | 1/1984 | Chertok et al. | |
| 4,515,525 A | 5/1985 | Doman | |
| 4,677,364 A | 6/1987 | Williams et al. | |
| 5,083,039 A | 1/1992 | Richardson et al. | |
| 5,155,375 A | 10/1992 | Holley | |
| 5,907,192 A | 5/1999 | Lyons et al. | |
| 6,626,642 B1 | 9/2003 | Veldkamp | |
| 6,672,837 B1 | 1/2004 | Veldkamp et al. | |
| 6,856,040 B2 | 2/2005 | Feddersen et al. | |
| 6,933,625 B2 | 8/2005 | Feddersen et al. | |
| 7,015,595 B2 | 3/2006 | Feddersen et al. | |
| 7,095,128 B2 | 8/2006 | Canini et al. | |
| 7,095,129 B2 | 8/2006 | Moroz | |
| 7,095,131 B2 | 8/2006 | Mikhail et al. | |
| 7,166,928 B2 | 1/2007 | Larsen | |
| 7,239,036 B2 | 7/2007 | D'Atre et al. | |
| 7,256,509 B2 | 8/2007 | Brandt et al. | |
| 7,312,537 B1 | 12/2007 | Walling | |
| 7,417,333 B2 | 8/2008 | Miller et al. | |
| 7,436,083 B2 | 10/2008 | Shibata et al. | |
| 7,602,075 B2 * | 10/2009 | Erdman et al. | 290/44 |
| 7,755,210 B2 | 7/2010 | Kammer et al. | |
| 7,837,439 B2 | 11/2010 | Bech | |
| 7,854,589 B2 | 12/2010 | Nielsen et al. | |
| 2003/0230898 A1 * | 12/2003 | Jamieson et al. | 290/55 |
| 2005/0012339 A1 | 1/2005 | Mikhail et al. | |
| 2006/0001268 A1 * | 1/2006 | Moroz | 290/44 |
| 2006/0002791 A1 * | 1/2006 | Moroz | 416/1 |
| 2006/0275121 A1 * | 12/2006 | Merswolke et al. | 416/132 B |
| 2007/0132247 A1 * | 6/2007 | Galayda et al. | 290/44 |
| 2007/0166147 A1 * | 7/2007 | Merswolke et al. | 415/4.1 |
| 2008/0106098 A1 | 5/2008 | Miller et al. | |
| 2009/0142193 A1 | 6/2009 | Bech | |
| 2009/0169357 A1 | 7/2009 | Slack | |
| 2009/0185901 A1 | 7/2009 | Nielsen et al. | |
| 2009/0246020 A1 | 10/2009 | Nielsen et al. | |
| 2010/0021303 A1 | 1/2010 | Nielsen et al. | |
| 2010/0189560 A1 | 7/2010 | Haraguchi | |
| 2010/0239426 A1 | 9/2010 | Westergaard | |
| 2010/0263448 A1 | 10/2010 | Hughes et al. | |
| 2010/0270809 A1 * | 10/2010 | Dahlhaug | 290/55 |
| 2010/0275695 A1 | 11/2010 | Cotrell et al. | |
| 2010/0301604 A1 | 12/2010 | Nielsen et al. | |
| 2010/0301605 A1 | 12/2010 | Nielsen et al. | |
| 2010/0314883 A1 | 12/2010 | Ollgaard | |
| 2011/0041617 A1 | 2/2011 | Cotrell et al. | |

FOREIGN PATENT DOCUMENTS

| | | |
|---|---|---|
| WO | 97/42409 | 11/1997 |
| WO | 9963219 A1 | 12/1999 |
| WO | 02/086314 | 10/2002 |
| WO | 2005/017350 | 2/2005 |
| WO | 2007/071239 | 6/2007 |
| WO | 2007/104306 | 9/2007 |
| WO | 2009068035 A2 | 6/2009 |
| WO | 2009068036 A2 | 6/2009 |

OTHER PUBLICATIONS

Daniel Trudnowski et al.; Independent Pitch Control Using Rotor Position Feedback for Wind-Shear and Gravity Fatigue Reduction in a Wind Turbine; May 8-10, 2002; pp. 4335-4340; Proceedings of the American Control Conference; Anchorage, AK.

USPTO, Office Action issued in related U.S. Appl. No. 12/744,820 dated Oct. 21, 2010.

USPTO, Notice of Allowance issued in related U.S. Appl. No. 12/744,820 dated Mar. 9, 2011.

* cited by examiner

WIND TURBINE, A METHOD FOR CONTROLLING A WIND TURBINE AND USE THEREOF

BACKGROUND OF THE INVENTION

The invention relates to a wind turbine, a method for controlling a wind turbine and use hereof.

DESCRIPTION OF THE RELATED ART

A wind turbine known in the art comprises a tapered wind turbine tower and a wind turbine nacelle positioned on top of the tower. A wind turbine rotor with a number of wind turbine blades is connected to the nacelle through a low speed shaft, which extends out of the nacelle front as illustrated on FIG. 1.

Oscillations and vibrations of the wind turbine blades are undesirable in that they strain the blade and the wind turbine structure unnecessarily which in worst-case can lead to reduced life of the blades or other parts of the wind turbine. In particular edge-wise oscillations is undesirable, in that the blade has little damping towards this mode of oscillations. Edgewise oscillations are oscillations along the chord between the trailing edge and the leading edge of the blade but because of the complex blade design of modern wind turbines and particularly because the blade twists in its longitudinal extend, edgewise oscillations will typically to some degree be combined with flap-wise oscillations, which is oscillations between the pressure side and the leeward side of the blade i.e. substantially perpendicular to the edgewise direction.

Edgewise oscillations are typically seen in both stall and pitch controlled wind turbines when the rotor is rotating and the wind turbine is producing power to a utility grid i.e. the wind turbine is operating. The stall controlled turbine is mostly facing this problem when operating in high winds beyond the stall point and the pitch regulated turbine is mostly facing this problem when operating in high wind where sudden wind gusts can cause the blades to stall momentarily.

But as wind turbines and wind turbine blades are getting larger and larger the properties of the blades changes accordingly such as the blade damping and/or the blade eigenfrequencies and therefore edgewise oscillations is also known to occur in the blades of wind turbines which are not operating i.e. in wind turbines where the rotor is idling or put to a complete standstill and the wind turbine is substantially not producing power to a utility grid.

Known countermeasures against edgewise oscillations are all developed for operating wind turbines and are therefore more or less ineffective in relation with non-operating wind turbines.

An object of the invention is therefore to provide for an advantageous technique for damping or eliminating edgewise oscillations in a blade of a wind turbine operating in an idling power producing situation in relation to a utility grid.

THE INVENTION

The invention provides for a wind turbine comprising a rotor comprising at least one rotor blade, a yaw controlling system including yaw control means, a yaw mechanism comprising one or more yaw motors and a yaw bearing, registration means for registering an idling power producing situation of the wind turbine in relation to a utility grid, and detection means for detecting edgewise oscillations in one or more of the blades. The yaw controlling system is adapted for changing the yaw position of the wind turbine nacelle when said registration means registers that said wind turbine is operating in an idling power producing situation and the detection means detects edgewise oscillations in one or more of the rotor blades, hereby damping or eliminating the edgewise oscillations.

Certain conditions can influence for edgewise oscillations to occur in the idling wind turbine rotor blades: the wind has to have a certain critical wind speed, the rotor blades have to have a certain design, the rotor blades have to be placed at a certain pitch angle, the rotor plane has to be in a certain angle relative to the incoming wind direction and other.

Wind turbines are by nature provided with the ability to change or alter the yaw angle of the nacelle in order to optimize the angle of the rotor plane in relation to the incoming wind.

Although for other purposes, the ability to alter the yaw angle is therefore already present in the wind turbines and by using this ability to alter at least one of the conditions needed for edgewise oscillations to occur or at least for edgewise oscillations to build up is advantageous, in that simple and cost-efficient means hereby is provided for damping or eliminating the edgewise oscillations in the blades of a wind turbine operating in an idling power producing situation in relation to a utility grid.

It should be emphasised that by the term "an idling power producing situation of the wind turbine in relation to a utility grid" is to be understood that the wind turbine is in a non-operating mode i.e. it is substantially not producing power to a utility grid and the rotor is put to a complete standstill or it is idling.

In an aspect of the invention, said detection means are one or more load sensors placed in or at said at least one rotor blade.

Load sensors placed in or at the blade, such as in or at the root of the blade, are advantageous in that such sensors are relatively simple and inexpensive and if properly implemented they provide reliable information on the load situation of the blade, including if the loads rhythmically shifts back and forth between the trailing edge side and the leading edge side of the blade, hereby indicating edgewise oscillations.

Furthermore, many modern wind turbines are already provided with load sensors in or at the blades to detect different loads during normal operation of the wind turbine i.e. when the wind turbine is producing power to a utility grid, and it is therefore advantageous and cost-effective to use the sensors that are already present.

In an aspect of the invention, said detection means are one or more accelerometers placed in or at said at least one rotor blade.

Accelerometers are excellent devices for providing information on the oscillation status of the blade and it is therefore advantageous to use accelerometers placed in or at the blade as detection means.

In an aspect of the invention, said detection means are one or more accelerometers placed in a nacelle of said wind turbine.

Usually the rotor rotates slowly when the wind turbine is idling and if one or more blades oscillate edgewise, these oscillations could transmit to the nacelle making the nacelle oscillate slightly around the yaw axis especially when the feathered oscillating blade is pointing sideward or the nacelle could tilt slightly in the vertical direction if the feathered oscillating blade is pointing upwards or downwards.

Only one or two accelerometers would then be needed to detect edgewise oscillations of the blades and since the nacelle presents a very controlled environment, where the accelerometer can be easily accessed, it is advantageous to place the oscillation sensors in the (more fixed) nacelle.

In an aspect of the invention, said yaw controlling system comprise means for changing said yaw position of the wind turbine nacelle between 0.5° and 30°, preferably between 2° and 15° and most preferred between 3° and 8° if said detection means detects edgewise oscillations in one or more of said blades.

If the yaw position is altered too little, when edgewise oscillations is detected, the oscillations might not be dampened or it takes a relative long time for the oscillations to stop. If the yaw position is altered too much the nacelle or other parts of the wind turbine could be strained unnecessarily much or the rotor might start rotating too fast, which could be disadvantageous. A too fast rotation during idling could strain and wear different parts of the wind turbine unnecessarily and it could lead to the rotor going bolting.

The present ranges for altering the yaw angle—when edgewise oscillations are detected—therefore presents an advantageous relation between damping efficiency and safety.

In an aspect of the invention, said yaw controlling system comprise means for returning said nacelle to its original yaw angle position, when said detection means detects that the size of said edgewise oscillations is below a predefined level.

This is advantageous, in that the nacelle hereby is returned to its parking position, hereby reducing the strain on the blades and other parts of the wind turbine.

In another aspect of the invention, said yaw controlling system comprises means for only altering the yaw angle of said nacelle if said detected edgewise oscillations is above a predefined level.

In an aspect of the invention, said control means further comprise a timer for giving of an alarm signal if the size of said edgewise oscillations has not dropped below a predefined level within a predefined period of time.

If the size of the edgewise oscillations has not dropped below a predefined level within a predefined period of time, something could be wrong or the blades could be damaged from the oscillations and it is therefore advantageous to make the control means give of an alarm. This alarm signal could then trigger that further edgewise oscillation damping procedures was commenced or it could be transferred to a surveillance centre or other that could evaluate the situation and take the necessary actions.

In an aspect of the invention, said yaw controlling system comprises means for altering the yaw angle of said nacelle to an optimal angle where said edgewise oscillations is substantially at a minimum. Hereby it is ensured that the edgewise oscillations is substantially stopped or minimized whereby it further is ensured that the strain of the rotor blades and the wind turbine structure is minimized which in turn results in prolonged life-time of the blades or other parts of the wind turbine In another aspect of the invention, said yaw controlling system comprises means for interrupting the alternation of the yaw angle of said nacelle if the size of said edgewise oscillations has decreased to a level below a defined threshold level.

Hereby it is ensured that no unnecessary yaw alternations is performed as to save energy and to minimize tear and wear of the yaw mechanics.

In another aspect of the invention, said yaw controlling system alters the yaw angle in relation to dampen edgewise oscillations on the basis of previous obtained data such as wind velocity values, trend values, former yaw angle control episodes etc.

Hereby it is ensured that an optimal altering of the yaw angle can be obtained and that said yaw control can be based on previous obtained data in such a way, that e.g. known control situations can be predicted and can be compensated for. Even further trend values and predicted situations can initialize altering of the yaw mechanism before an actual event which in turn may even inhibit the occurrence of edgewise oscillations.

In an even further aspect of the invention, said yaw controlling system comprises memory to store previous obtained data values. Hereby it is ensured that said yaw control can operate optimal and base its control strategy on previous obtained data values.

In another aspect of the invention said yaw controlling system comprises data processing capabilities to process data values and to calculate e.g. trend values of the yaw control.

Furthermore, the invention provides for a method for controlling a wind turbine. The method comprises the steps of:
registering if said wind turbine is operating in an idling power producing situation in relation to a utility grid,
establishing an edgewise oscillation value of a wind turbine rotor blade of said wind turbine, and
changing the yaw angle of the nacelle of said wind turbine if said wind turbine is operating in an idling power producing situation and said edgewise oscillation value is above a predefined level, hereby damping or eliminating the edgewise oscillation.

Hereby is provided a simple and cost-efficient method for damping or eliminating edgewise oscillations in the blades of a wind turbine in an idling power producing situation in relation to a utility grid.

In an aspect of the invention said nacelle is returned to its original yaw angle position, when said edgewise oscillation value has dropped below a further predetermined level.

In an aspect of the invention an alarm signal is transmitted if said edgewise oscillation value has not dropped below a predetermined level within a predetermined time.

In an aspect of the invention said edgewise oscillation value is established by means of load measurements of said blade.

In an aspect of the invention said yaw angle is altered in a direction which reduces the rotational speed of the wind turbine rotor, if the rotational speed of said rotor is above a predefined level.

In an aspect of the invention said yaw angle is altered in a direction which increases the rotational speed of the wind turbine rotor, if the rotational speed of said rotor is below a predefined level.

The invention furthermore relates to the use of method according to any of claims 14 to 20, wherein said wind turbine is a pitch or active stall controlled wind turbine comprising means for detecting edgewise oscillations.

FIGURES

Figure 2:
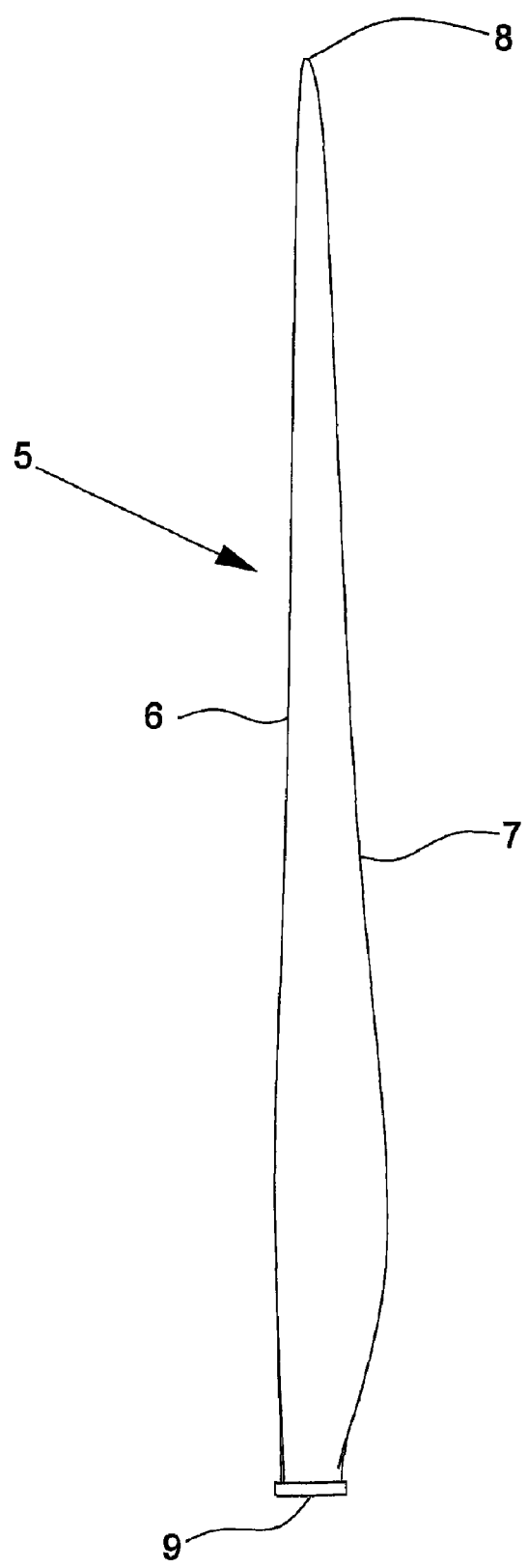
Figure 3:
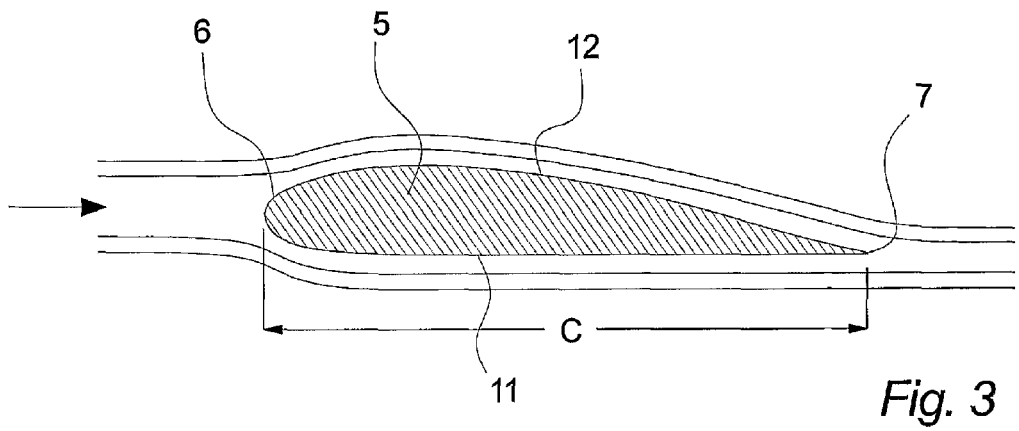
Figure 4:
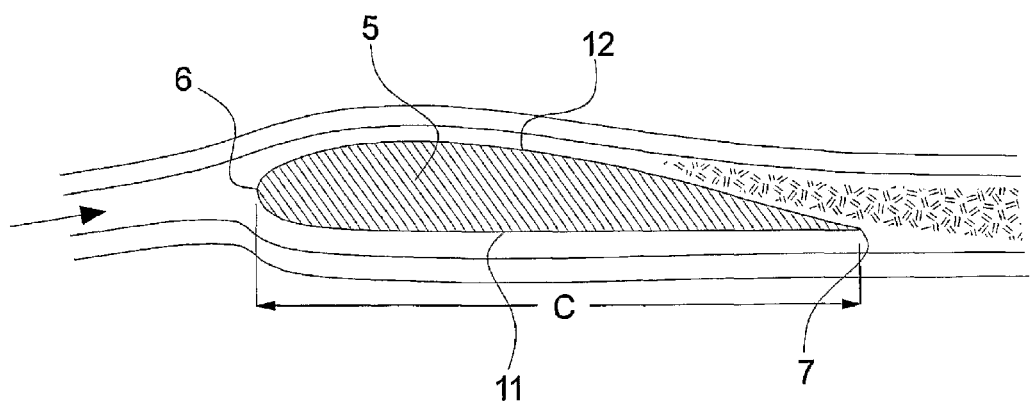
Figure 5:
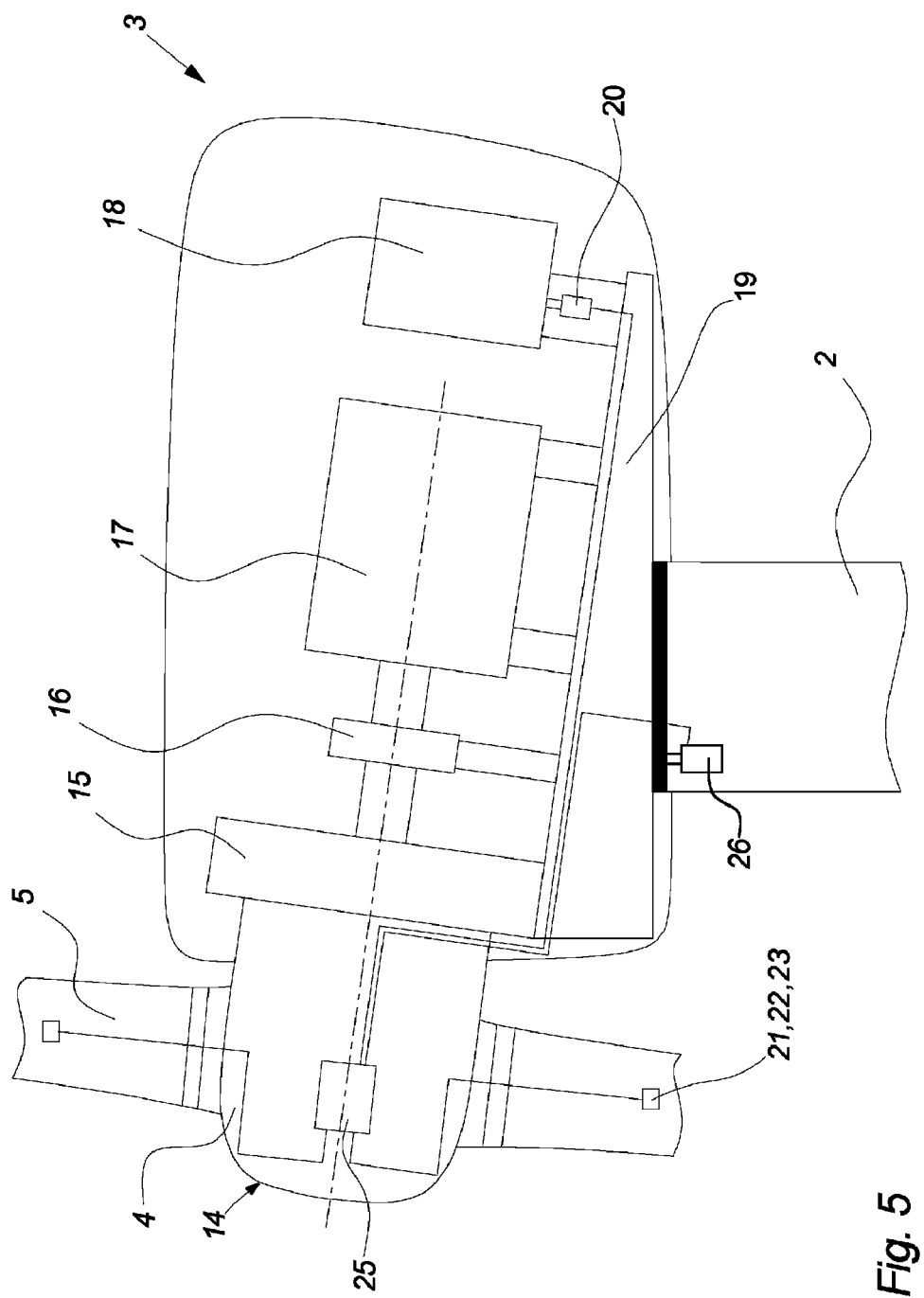

The invention will be described in the following with reference to the figures in which FIG. 1. illustrates a large modern operating wind turbine known in the art, as seen from the front, FIG. 2 illustrates a wind turbine blade, as seen from the front, FIG. 3 illustrates a cross-section of an idling wind turbine blade in a non-stall situation, as seen from the root of the blade, FIG. 4 illustrates a cross-section of an idling wind turbine blade in a stall situation, as seen from the root of the blade, FIG. 5 illustrates a simplified cross section of a nacelle, as seen from the side.

DETAILED DESCRIPTION OF RELATED ART

FIG. 1 illustrates a modern operating wind turbine 1, comprising a tower 2 and a wind turbine nacelle 3 positioned on top of the tower 2. The wind turbine rotor 4, comprising three wind turbine blades 5, is connected to the nacelle 3 through the low speed shaft which extends out of the nacelle 3 front.

In this embodiment the wind turbine 1 comprise three blades 5 but in another embodiment the wind turbine 1 could comprise another number of blades 5 such as one, two, four or more.

DETAILED DESCRIPTION OF THE INVENTION

FIG. 2 illustrates a wind turbine blade 5, as seen from the front/pressure side 11. The wind turbine blade 5 comprises a leading edge 6, a trailing edge 7, a tip 8 and a root 9. A wind turbine blade 5 known in the art is typically made of a glass fibre and resin composite reinforced by carbon fibre, carbon fibre reinforced wood or a combination hereof.

A wind turbine blade 5 typically has an elastic centre which is closer to the leading edge 6 than to the trailing edge 7, at least regarding most parts of the blade 5. If edgewise oscillations occur at a frequency at or close to the blades first natural edgewise frequency, especially the trailing edge 7 is therefore exposed to considerable strain, which under certain conditions could reduce the life of the blade 5.

FIG. 3 illustrates a cross-section of an idling wind turbine blade 5 in a non-stall situation, as seen from the root of the blade 5.

In this embodiment the blade 5 is a blade 5 of an ordinary pitch regulated wind turbine 1 where the blade 5 is feathered i.e. the blade 5 is shown in a parking position where the blade 5 is pitched so that the chord C of the blade 5 is substantially parallel with the incoming wind. Because wind turbine blades 5 known in the art twists throughout their longitudinal extend it will usually only be for some parts of the blade 5 that the chord C is substantially parallel with the incoming wind when put in parking position.

For the example of e.g. a blade 5 of a pitch controlled wind turbine 1, the blade is typically pitched so that the leading edge 6 is facing the incoming wind, when the blade 5 is feathered whereas a blade 5 of an active stall regulated wind turbine 1 typically will make the trailing edge 7 face the incoming wind, when the blade 5 is feathered but otherwise it is substantially the same mechanisms affecting the blades 5 of the two wind turbine types when idling.

When a pitch controlled wind turbine 1 is producing power during normal operation, the turbines electronic controller checks the power output of the turbine 1 e.g. several times per second. When the power output becomes too high, the controller sends an order to the blade pitch mechanism 13, which immediately pitches (turns) the rotor blades 5 slightly out of the wind. Likewise, the blades 5 are turned back into the wind whenever the wind drops again. During normal operation the blades 5 of a pitch regulated wind turbine 1 usually only pitch a fraction of a degree at a time—and the rotor 4 will be turning at the same time.

For various embodiments of a wind turbine, if the wind speed of the incoming wind increases above a certain level, such as 25 meters/sec., the controller will feather the blades 5 to make the rotor 4 stop rotating or at least make the rotor idle and the wind turbine will substantially stop producing power to the utility grid. This is among other reason done to protect the blades 5 and the rest of the wind turbine 5 from damaging overload at high wind speeds.

If the rotor 4 is not directly fixed against rotation when the wind turbine 1 is idle, the idling situation does not necessarily mean that the rotor 4 stop rotating. Actually the rotor 4 will more often than not rotate slowly and it has also happened that the rotor 4 is rotating backwards in relation to the direction of rotation, when the wind turbine 1 is not idling i.e. when it is producing power to a utility grid.

FIG. 4 illustrates a cross-section of an idling wind turbine blade 5 in a stall situation, as seen from the root 9 of the blade 5.

The blade 5 illustrated in FIG. 4 is a feathered blade 5 on an idling active stall regulated wind turbine 1, illustrated during a sudden gust of wind creating an undesired stall situation. In another embodiment it could also be a blade 5 on an idling pitch regulated wind turbine 1.

Technically an active stall controlled wind turbine 1 resembles a pitch controlled wind turbine 1, in that they both have pitchable blades, and in order to get a reasonably large torque (turning force) at low wind speeds, the active stall controlled wind turbine 1 will usually be programmed to pitch the blades 5 much like a pitch controlled wind turbine 1 at low wind speeds. When the active stall controlled wind turbine 1 reaches its rated power, however, one will notice an important difference from the pitch controlled wind turbines 1: If the generator 17 is about to be overloaded, the active stall controlled wind turbine 1 will pitch its blades 5 in the opposite direction from what a pitch controlled wind turbine 1 does. In other words, it will increase the angle of attack of the rotor blades 5 in order to make the blades 5 go into a deeper stall, thus wasting the excess energy in the wind.

Feathered blades 5 on an idling pitch controlled or stall controlled wind turbine 1 do usually not stall, in that the wind will pass the blade 5 substantially undisturbed and the yaw mechanism of the wind turbine 1 will ensure that the rotor plane substantially always is perpendicular to the direction of the incoming wind, making the wind pass the blades 5 substantially as illustrated in FIG. 3 and if the feathered blades 5 should stall it is usually of very little or no consequence.

However, under certain circumstances gusts of wind from varying directions can arise so fast, that the turbines 1 control system or the yaw mechanism is not able to react fast enough and for a short period of time stall can occur. These short stall periods can induce edgewise oscillations in the blade 5, which potentially can be very damaging. Particularly if these gusts happen rhythmically at a frequency at or close to the blades 5 first natural edgewise frequency the energy of the edgewise oscillations can build up.

Likewise, aerodynamic phenomenon's like Von Kármán vortex street, periodic flow separation, turbulence or local vortexes can under certain circumstances induce edgewise oscillations in the feathered blade 5, particularly if these phenomenon's happen periodically or rhythmically at or in phase with a frequency at or close to the blades 5 first natural edgewise frequency.

FIG. 5 illustrates a simplified cross section of a nacelle 3 of a pitch or active stall regulated wind turbine 1, as seen from the side. Nacelles 3 exists in a multitude of variations and configurations but in most cases the drive train in the nacelle 3 comprise one or more of the following components: a gear 15, a coupling (not shown), some sort of breaking system 16 and a generator 17. A nacelle 3 of a modern wind turbine 1 can also include a converter 18 (also called an inverter) and additional peripheral equipment such as further power handling equipment, control cabinets, hydraulic systems, cooling systems and more.

The weight of the entire nacelle 3 including the nacelle components 15, 16, 17, 18 is carried by a strengthening structure 19. The components 15, 16, 17, 18 are usually placed on and/or connected to this common load carrying structure 19. In this simplified embodiment the strengthening structure 19 only extends along the bottom of the nacelle 3 e.g. in form of a bed frame to which some or all the components 15, 16, 17, 18 are connected. In another embodiment the strengthening structure 19 could comprise a gear bell transferring the load of the rotor 4 to the tower 2, or the load carrying structure 19 could comprise several interconnected parts such as latticework.

In this embodiment of the invention the drive train is established in an angle in relation to a horizontal plane. The drive train is for among other reasons angled to enable that the rotor 4 can be angled correspondingly e.g. to ensure that the blades 5 do not hit the tower 2, to compensate for the differences in wind speed at the top and bottom of the rotor 4 and other.

In this embodiment of the invention detection means 21 are accelerometers 22 placed in each of the blades 5 to detect if the individual blade 5 oscillates edgewise. In that the amplitude of edgewise oscillations of a blade 5 will increase with the distance from the root 9 of the blade 5 the detection means 21 are in this embodiment of the invention accelerometers placed inside the blades 5 at a given distance from the root 9 of the blade 5.

The detection means 21 could also be placed at the back of the nacelle 3 in the form of one or more accelerometers 22 attached to the back of the strengthening structure 19. The accelerometer 22 would then be mounted in such a way that edgewise oscillations of the blades 5 leading to horizontal or substantially horizontal oscillations of the nacelle and/or vertical oscillations trying to tilt the nacelle vertically were detected.

Edgewise oscillations of the blades 5 can induce oscillations of the nacelle 3 e.g. making the nacelle 3 oscillate slightly around the centre of the tower 2, i.e. in the yawing direction, which is why these oscillations can be detected relatively reliably at the back of the nacelle 3. Typical frequencies of edgewise oscillations (first natural frequency) are in the interval of 0.9-1.8 Hz.

In another embodiment of the invention the detection means 21 could be other types of sensors than accelerometers 22—such as microphones, strain-gauges, optical fibres or other, it or they could be placed differently in the blades 5 or the oscillation sensors 21 could be placed outside the blades 5 such as in or at the rotational axis of a rotor 4 e.g. in the hub 14 centre or in the nacelle 3.

The detection means 21 could simply be means already present in the wind turbine 1 for detecting loads or other during normal operation of the wind turbine 1 such as the tower oscillation sensors usually placed at the tower top to detect if the tower oscillates, where the edgewise oscillations of the blades 5 could be transmitted through the nacelle 3 to the tower 2 and be detected as slight vibrations of the tower 2. It could also be load sensors 23 placed at the root 9 of the blade 5 to detect the load on the blade 5 during normal operation, in that during idling these sensors would typically.

The wind turbine 1 is also provided with registration means 20 for detecting if the wind turbine 1 is operating in an idling power producing situation in relation to the utility grid i.e. if the wind turbine 1 substantially is not producing power to the utility grid, to which the wind turbine 1 would deliver power during normal operation of the wind turbine 1.

In this embodiment the registration means 20 is an ammeter measuring if there is any electrical output from the converter 18 or at least if the electrical output is below a certain low and insignificant level, but in another embodiment the registration means 20 could be a voltmeter or other and the registration means 20 could measure or register elsewhere such as on the generator 17, on the power lines in or outside the wind turbine 1, at a central power unit outside the wind turbine 1 or elsewhere.

The registration means 20 also includes means which only indirectly detects if the wind turbine 1 is idling, e.g. encoders, tachometers or other detecting if the main shaft or other ordinarily rotating parts are rotating or at what speed they are rotating. If these parts do not rotate or only rotate at very low speed it could indicate that the wind turbine 1 was idling.

Various embodiments of horizontal axis wind turbines use forced yawing i.e. they use a yaw controlling system including yaw control means 25 and a yaw mechanism 24 which uses e.g. electric motors and gearboxes to keep the rotor yawed against the wind by rotating the nacelle 3 on the top of the tower 2.

Often the yaw mechanism 24 comprises one or more yaw motors, a yaw bearing and yaw brakes e.g. to brake the yaw mechanism whenever it is unused. The yaw mechanism is activated by yaw control means 25 that controls the yaw angle or yaw position e.g. on the basis of a position feedback signal from a position sensor.

For various embodiments of the invention the yaw control means 25 is placed in the hub 14 but in other embodiments the yaw control means 25 would be placed in the nacelle 3, in the tower 2, in a neighboring house or elsewhere e.g. at the same location as the mechanism for controlling the yaw in relation to load, power or other during normal operation of the wind turbine 1. In other embodiments said yaw control means 25 can even be integrated in the yaw mechanism.

According to one embodiment of the invention the detection means 21 and the registration means 20 is connected to yaw control means 25. If the wind turbine 1 is idling and if edgewise oscillations of the blades 5 are detected or if edgewise oscillations above a certain level are detected, the yaw control means 25 can initiate that the yaw mechanism 24 is controlled as to alter the yaw angle.

For one embodiment of the invention the control of the yaw angle in relation to dampen edgewise oscillations, is an iterative process or adaptive system following this simplified control scheme comprising the steps of:

1—registration means 20 registers if the wind turbine 1 is operating in an idling power producing situation in relation to a utility grid
2—detect values of the level of edgewise oscillations e.g. by detection means 21
3—process the registrations and the detected values
4—initiate altering of the yaw angle
5—detect new values of the level of edgewise oscillations e.g. by detection means 21
6—determine whether the level of edgewise oscillations has increased or decreased.
7—if said level has decreased: initiate altering of the yaw angle in the same direction as in step 3.
8—if said level has increased: initiate altering of the yaw angle in the opposite direction as in step 3.
9—if a minimum of edgewise oscillations has been reached: stop the altering of the yaw angle.

Hereby the yaw angle is controlled as to substantially minimize said edgewise oscillations.

For another embodiment of the invention the above control scheme can be interrupted as soon the level of edgewise oscillations is detected as to have decreased to a level below a defined threshold level.

For another embodiment of the invention, the yaw angle is controlled in relation to dampen edgewise oscillations on the basis of previous obtained data, said data can be e.g. wind velocity values, trend values, former yaw angle control episodes etc.

For various embodiments the yaw control means 25 comprises memory as to store said previous obtained data and/or the yaw control means comprises data processing capabilities to process data and to calculate e.g. said trend values.

For further embodiments, if the edgewise oscillations has not dropped below a predetermined level within a predetermined period of time, the yaw control means could comprise means for sending an alarm initiating that dampening procedures was commenced. Likewise, if the edgewise oscillations continues to grow in size—even though the nacelle 3 have been activated to counteract the oscillations via said yaw control—an alarm signal could be transmitted to an external surveillance unit or other.

In an embodiment of the invention the nacelle 3 is returned to its original or substantially to its original parking position, immediately or after a specific predetermined time but in a preferred embodiment the nacelle 3 is returned, when the detection means 21 detects that the size of the oscillations has dropped below a certain predefined level again.

In a further embodiment the nacelle 3 could also be maintained in its new yaw angle and then only moved again if further edgewise oscillations where detected, if the rotor is running too fast, too slow or in the wrong direction, if the wind turbine was returned to operation mode or if other conditions necessitate a change of the yaw position. Hereby the yaw position is only changed when absolutely necessary, whereby energy is saved and wear is reduced.

In another embodiment of the invention the yaw control means 25 could also comprise means for increasing the gain of the yaw control means if the size of the oscillations rises above a certain predefined level, if the size of the oscillations has not been dampened below a predefined level within a certain predefined time such as between 1 and 1000 seconds, preferably between 10 and 500 seconds and/or if the size of the oscillations has been above a certain predefined level for at least a certain predefined time.

The gain is the part of the control algorithm in the yaw control means which controls the size of the reaction at a given oscillation level e.g. by controlling how much the input signal from the detection means 21 (e.g. the amplitude of the edgewise oscillations) is amplified in the control algorithm in the yaw control means, hereby controlling how much the yaw angle is alternated at a given input signal.

The above mentioned predefined level e.g. determining if the blades 5 should be returned to their original pitch angle position, determining if the pitch angle should be changed, determining if an alarm procedure should be started and other could be determined as a percentage-wise exceeding of a known load, e.g. if it was detected that the gravity pull in the blades 5 would result in a given maximum load measured by the load sensors at the root 9 of the blade 5, this predefined level could be that this given maximum load was exceeded by at least 5% and preferably by at least 15% such as 20%, indicating that the blade 5 is influenced by other forces than gravity i.e. the blade 5 could be oscillating edgewise particularly if this load exceedings happens rhythmically and within one or more frequency ranges such as between of 0.1 and 5 Hz, preferably between 0.5 and 3 Hz indicating that the exceedings originates from edgewise oscillations and not just from some brief aerodynamic phenomenon's.

Likewise, if the detection means 21 was one or more accelerometers placed in the blades 5, in the hub, in it nacelle 3 or in the tower 2 the predetermined levels could also be defined as a percentage-wise exceeding of a known acceleration level.

The levels could also be defined as a percentage of an acceptable load or acceleration or simply be based on statistical or empiric values or based on practical tests.

The invention has been exemplified above with reference to specific examples of wind turbines 1, detection means 21, embodiments of a method for damping edgewise oscillations and other. However, it should be understood that the invention is not limited to the particular examples described above but may be designed and altered in a multitude of varieties within the scope of the invention as specified in the claims.

LIST

1. Wind turbine
2. Tower
3. Nacelle
4. Rotor
5. Blade
6. Leading edge
7. Trailing edge
8. Tip
9. Root
10. Crack
11. Pressure side
12. Leeward side
13.
14. Hub
15. Gear
16. Breaking system
17. Generator
18. Converter
19. Strengthening structure
20. Registration means
21. Detection means
22. Accelerometer
23. Load sensors
24. Yaw mechanism
25. Yaw control means
C. Chord

The invention claimed is:

1. A wind turbine comprising:
a rotor comprising at least one rotor blade,
a yaw controlling system including a yaw controller, a yaw mechanism comprising one or more yaw motors and a yaw bearing,
a registrant for registering an idling power producing situation of said wind turbine in relation to a utility grid, and
a detector for detecting edgewise oscillations in one or more of said blades, wherein
said yaw controlling system is adapted for changing the yaw position of the wind turbine nacelle when said registrant registers that said wind turbine is operating in an idling power producing situation and said detector detects edgewise oscillations in one or more of said rotor blades, hereby damping or eliminating said edgewise oscillations.

2. The wind turbine according to claim 1, wherein said detector includes one or more load sensors placed in or at said at least one rotor blade.

3. The wind turbine according to claim 1, wherein said detector includes one or more accelerometers placed in or at said at least one rotor blade.

4. The wind turbine according to claim 1, wherein said detector includes one or more accelerometers placed in a nacelle of said wind turbine.

5. The wind turbine according to claim 1, wherein said yaw controlling system comprises a yaw position changer for changing said yaw position of the wind turbine nacelle between 0.5° and 30° if said detector detects edgewise oscillations in one or more of said rotor blades.

6. The wind turbine according to claim 1, wherein said yaw controlling system comprises a nacelle returner for returning said nacelle to its original yaw angle position, when said detector detects that the size of said edgewise oscillations is below a predefined level.

7. The wind turbine according to claim 1, wherein said yaw controlling system comprises a yaw angle alterer for only altering the yaw angle of said nacelle if said detected edgewise oscillations is above a predefined level.

8. The wind turbine according to claim 1, wherein said yaw controlling system further comprises a timer for giving an alarm signal if the size of said edgewise oscillations has not dropped below a predefined level within a predefined period of time.

9. The wind turbine according to claim 1, wherein said yaw controlling system comprises an optimal angle alterer for altering the yaw angle of said nacelle to an optimal angle where said edgewise oscillations is substantially at a minimum.

10. The wind turbine according to claim 1, wherein said yaw controlling system comprises an interrupter for interrupting the altering of the yaw angle of said nacelle if the size of said edgewise oscillations has decreased to a level below a defined threshold level.

11. The wind turbine according to claim 1, wherein said yaw controlling system alters the yaw angle in relation to dampen edgewise oscillations on the basis of previous obtained data.

12. The wind turbine according to claim 1, wherein said yaw controlling system comprises a memory to store previous obtained data values.

13. The wind turbine according to claim 1, wherein said yaw controlling system comprises data processing capabilities to process data values and to calculate.

14. A method for controlling a wind turbine, comprising:
registering if the wind turbine is operating in an idling power producing situation in relation to a utility grid,
establishing an edgewise oscillation value of a wind turbine rotor blade of the wind turbine, and
changing the yaw angle of the nacelle of the wind turbine if the wind turbine is operating in an idling power producing situation and the edgewise oscillation value is above a first predefined level, hereby damping or eliminating the edgewise oscillation.

15. The method according to claim 14, wherein the changing the yaw angle of the nacelle of the wind turbine includes changing the yaw angle from a first yaw angle position to a second yaw angle position, and further comprising:
returning the nacelle to the first yaw angle position when the edgewise oscillation value has dropped below a second predetermined level.

16. The method according to claim 14, wherein an alarm signal is transmitted if the edgewise oscillation value has not dropped below a second predetermined level within a predetermined time.

17. The method according to claim 14 further comprising:
measuring a load of the blade with a load sensor, wherein the edgewise oscillation value is established by means of the load measurement of the blade.

18. The method according to claim 14 further comprising:
determining a rotational speed of the rotor, wherein the yaw angle is changed in a direction which reduces the rotational speed of the wind turbine rotor, if the rotational speed of the rotor is above a predefined level.

19. The method according to claim 14 further comprising:
determining a rotational speed of the rotor, wherein the yaw angle is changed in a direction which increases the rotational speed of the wind turbine rotor, if the rotational speed of the rotor is below a predefined level.

20. Use of the method according to claim 14, wherein the wind turbine is a pitch or active stall controlled wind turbine comprising a detector for detecting edgewise oscillations.

* * * * *

UNITED STATES PATENT AND TRADEMARK OFFICE
CERTIFICATE OF CORRECTION

PATENT NO. : 8,362,632 B2
APPLICATION NO. : 12/744740
DATED : January 29, 2013
INVENTOR(S) : Thomas S. Nielsen et al.

It is certified that error appears in the above-identified patent and that said Letters Patent is hereby corrected as shown below:

At column 11, claim number 7, line number 7, change "is" to --are--

At column 11, claim number 9, line number 17, change "is" to --are--

Signed and Sealed this
Second Day of April, 2013

Teresa Stanek Rea
*Acting Director of the United States Patent and Trademark Office*